US012351445B2

(12) United States Patent
Mueller et al.

(10) Patent No.: US 12,351,445 B2
(45) Date of Patent: Jul. 8, 2025

(54) CENTERING A CONTAINER FOR THE PROCESSING THEREOF

(71) Applicant: KRONES AG, Neutraubling (DE)

(72) Inventors: Holger Mueller, Neutraubling (DE); Leroy Heinich, Neutraubling (DE); Michael Trummet, Neutraubling (DE); Florian Habersetzer, Neutraubling (DE); Greig Mackintosh, Neutraubling (DE)

(73) Assignee: KRONES AG, Neutraubling (DE)

( * ) Notice: Subject to any disclaimer, the term of this patent is extended or adjusted under 35 U.S.C. 154(b) by 69 days.

(21) Appl. No.: 18/318,388

(22) Filed: May 16, 2023

(65) Prior Publication Data

US 2023/0406685 A1 Dec. 21, 2023

(30) Foreign Application Priority Data

May 17, 2022 (DE) ..................... 10 2022 112 345.6

(51) Int. Cl.
*B67C 3/26* (2006.01)
*B67C 7/00* (2006.01)

(52) U.S. Cl.
CPC .................. *B67C 3/26* (2013.01); *B67C 7/00* (2013.01); *B67C 2003/2648* (2013.01); *B67C 2003/266* (2013.01)

(58) Field of Classification Search
CPC ...... B67C 2003/2648; B67C 2003/266; B67C 3/242; B67C 3/26; B67C 7/00
See application file for complete search history.

(56) References Cited

U.S. PATENT DOCUMENTS

2016/0152459 A1* 6/2016 Stienen ..................... B67C 3/24 53/410
2017/0008745 A1* 1/2017 Melrose ................ B65B 31/046
(Continued)

FOREIGN PATENT DOCUMENTS

DE 2548976 A1 * 3/1975
DE 102014104873 10/2015
(Continued)

OTHER PUBLICATIONS

Machine translation of DE-102018133400-A1 (Year: 2018).*
(Continued)

*Primary Examiner* — Anna K Kinsaul
*Assistant Examiner* — Himchan Song
(74) *Attorney, Agent, or Firm* — Haynes and Boone, LLP

(57) ABSTRACT

A device and method for centering a container during travel into a processing region, wherein the device has: a receiving section configured to receive the container; a guiding section configured to guide a translational movement along a defined trajectory between a receiving position and a processing position; a chamber wall having an opening, wherein the receiving section and the guiding section are configured to insert at least some section of the container into the processing region; a sealing device having an inflatable seal, which is arranged in the opening and configured to adopt a sealing position around a container section in the processing position; and a control device, which is in communication with the sealing device and is configured to at least partially inflate the inflatable seal during the translational movement of the container from the receiving position into the processing position.

16 Claims, 3 Drawing Sheets

(56) References Cited

U.S. PATENT DOCUMENTS

| | | | | |
|---|---|---|---|---|
| 2019/0330038 | A1* | 10/2019 | Melrose | B65B 7/2835 |
| 2020/0156916 | A1* | 5/2020 | Knott | B67C 3/007 |
| 2022/0055881 | A1* | 2/2022 | Krulitsch | B67C 7/0006 |

FOREIGN PATENT DOCUMENTS

| | | | | |
|---|---|---|---|---|
| DE | 102017210949 | | 1/2019 | |
| DE | 102018133400 | A1 * | 6/2020 | |
| DE | 102019104137 | A1 * | 8/2020 | B67B 3/00 |
| DE | 102019128738 | A1 | 4/2021 | |
| DE | 102021113364 | | 11/2022 | |
| DE | 102021113364 | A1 * | 11/2022 | |
| EP | 3705449 | | 9/2020 | |
| WO | WO 2010/149233 | A1 | 12/2010 | |
| WO | WO 2019/048656 | A1 | 3/2019 | |

OTHER PUBLICATIONS

Machine translation of DE-102019104137-A1 (Year: 2019).*
Machine translation of DE-102021113364-A1 (Year: 2021).*
Machine translation of DE-2548976-A1 (Year: 1977).*
Search Report DE 10 2022 112 345.6, dated Mar. 3, 2023, 8 pages.
Extended European Search Report dated Oct. 19, 2023, from related European Application No. 23173868.3, 8 pages.

* cited by examiner

CENTERING A CONTAINER FOR THE PROCESSING THEREOF

CROSS-REFERENCE TO RELATED APPLICATIONS

This application claims priority from German Patent Application No. DE 10 2022 112 345.6, filed on May 17, 2022 in the German Patent and Trademark Office, the disclosure of which is incorporated herein by reference in its entirety.

BACKGROUND

Technical Field

The present invention relates to a device for centering a container during travel thereof into a processing region, for example for filling and/or closing the container in a beverage filling plant.

Related Art

Among the various methods and devices for bottling filling products in beverage filling plants, a technology is known in which the container to be filled is moved from bottom to top into a processing chamber in order to be filled therein and, if appropriate, immediately closed. One method step here relates to the pressure-tight pressing of the container against a filling member within the processing chamber, which must take place in a centered manner in order to ensure a trouble-free filling process.

DE 10 2014 104 873 A1 describes a process for the abrupt filling of containers, in which the filling product is provided under an excess pressure, the container to be filled is evacuated, and the filling product under excess pressure is introduced into the container under a vacuum. Owing to the pressure difference produced in this way, the introduction of the filling product takes place almost immediately. In order to shorten the settling time of the filling product after the filling of the container and to prevent foaming and foam spilling over, the container is closed under excess pressure without pressure equalization of the container interior with the external environment taking place beforehand. Here, the various process steps take place in a processing chamber of the abovementioned type.

In order to carry out such or similar processing in a processing chamber, the container to be processed is moved from below into the processing chamber by a holder, for example a clamp and/or lifting device on the container bottom side, in such a way that at least the mouth region of the container is located in the processing chamber. In this case, sealing of the processing chamber with respect to the external environment is necessary in order to be able to monitor the atmosphere and pressure conditions in the processing chamber during processing.

The correct alignment/centering of the container is performed during the insertion of the container into the processing chamber, for example by means of a neck clamp, which is moved upward together with the container by the upward movement of the latter. A device and a method for centering a container during travel thereof into a processing region are disclosed, for example, in EP 3 705 449 A1.

The container must be handled very precisely during entry into the processing chamber in order to ensure that the corresponding section of the container and, in particular, the mouth of the container are placed exactly centrally with respect to any processing member and to the seal of the processing chamber. Otherwise, the sealing may be inadequate, and the actual processing operation cannot be started or takes place incorrectly or with too high a media consumption. Precise and reliable handling is made more difficult by the fact that the clamp for holding the container often does not completely surround the corresponding container section, e.g. bottle neck, outside the processing chamber, for reasons connected with the design or the process.

In addition, manufacturing and/or use-related deviations of the containers from the desired shape may occur. Thus, for example, container diameters are subject to certain fluctuations in the body and/or neck region, particularly in the case of glass bottles. When the container is centered by a neck clamp during the upward movement, a force may therefore act radially outwards on the container, which is not conducive to correct placement/centering. The variance of the container shapes has an effect on when the container is in contact with the clamp and how severely the position/orientation of the container is affected.

Centering by a neck clamp is thus subject to fluctuations which can make it impossible to establish adequate sealing between the container and the processing chamber. Even when an inflatable seal is used, inadequate centering can leave a gap between the seal in the inflated state and the corresponding container section, for example a bottle neck.

SUMMARY

Improving the centering of a container for its processing, for example for filling and/or closing it in a beverage filling plant is described herein according to various embodiments.

The device, also referred to herein as a "centering device", serves to center a container during travel thereof into a processing region. The processing to be carried out in the processing region in one embodiment comprises filling the container with a filling product and/or closing the container with a closure. The proposed device is in certain embodiments part of a beverage filling plant. Examples of beverages to be bottled are water (carbonated or still), soft drinks, juices, dairy products, sauces, alcoholic beverages such as beer or wine, mixed drinks, etc.

The device has a receiving section configured to receive the container in at least one section thereof, and a guiding section configured to guide a translational movement of the receiving section along a defined trajectory between a receiving position for reception of the container by the receiving section and a processing position for processing the container in the processing region.

The receiving section serves, in particular, for the temporary stabilization of the container during its travel into the processing region. In the case of a bottle, such as a glass or plastic bottle, the bottle neck is in some embodiments received or at least partially surrounded by the receiving section. The guiding section can carry out initial centering, also referred to herein as "travel centering", ensuring that the container is at least roughly aligned during travel.

The device also has a chamber wall having an opening, wherein the receiving section and the guiding section are configured to insert at least some section or sections of the container, in several embodiments the mouth section thereof, into the processing region through the opening during the translational movement from the receiving position into the processing position.

In use of the device as intended, the processing region is normally located above the opening, and therefore the container is moved into the processing region from the bottom upwards through the opening. The processing region is in one or more embodiments defined by a sealable processing chamber. In other words, the processing region is in some embodiments located in the interior of a processing chamber which has a chamber wall with said opening. In this case, the chamber wall in question is in certain embodiments a lower chamber wall since the container is normally moved vertically from below into the processing chamber.

The device also has a sealing device having an inflatable seal, which is arranged in the opening and configured to adopt a sealing position around a container section, for example a bottle neck, in the processing position. The inflatable seal is in some embodiments an annular part consisting of an elastic material, which reduces the effective diameter of the opening in the inflated state. To seal the opening in the processing position, a sealing surface of the inflated seal thus comes to rest around the corresponding container section, thereby sealing off the processing region from the external environment.

The device also has a control device, which is in communication with the sealing device and is configured to activate, i.e. at least partially inflate, the inflatable seal during the translational movement of the container from the receiving position into the processing position. Thus, a simultaneous translational movement of the container and activation of the inflatable seal take place, at least temporarily.

In this way, by means of the function of the inflatable seal, the container is brought into a central position, in which the container is subsequently sealed with respect to the atmosphere in the processing region, in particular a vacuum and/or excess pressure. The inflatable seal thus synergistically performs two functions: a function of sealing the processing region with respect to the external environment and a function of centering the container, also referred to herein as “seal centering”. Once moved into the central position, the container can then cover any remaining travel distance as far as the processing position. The travelling or upward movement thus takes place in the activated or partially activated state of the inflatable seal, i.e. in a completely or partially inflated state of the seal and, in particular, during the inflation process.

Owing to the seal centering that can be carried out in this way, it is not necessary for complete centering to be performed by the receiving section. On the contrary, it is the sealing device with the inflatable seal, under the control of the control device, which brings the container into the optimally centered position that ensures complete sealing of the container and trouble-free processing.

By means of the seal centering, optimum alignment and sealing of the container to be processed can be achieved in a reliable and repeatable way. This success is substantially independent of the nature of the seal and any deviations in shape and/or size of the containers. In this way, the desired processing of the container is reliably ensured, and the intended quality parameters, for example any $O_2$ absorption and/or $CO_2$ consumption, can be achieved.

The seal centering also makes it possible to reduce the centering function performed by the receiving section, thereby making it possible to simplify the construction of the receiving section and the guiding section. In particular, it is possible, when changing the container format, to dispense with replacement of a correspondingly optimally adapted receiving section. Since the receiving section then only has to guide the container as far as the seal, but not to center it, or to center it only roughly, the receiving section can be configured in such a way that it can be used for all or at least many container formats. This saves manufacturing costs and shortens the stoppage times of the device during a format change.

The seal centering can be achieved without the container having to pass through under a conventional centering ring. Actuators for moving such a centering ring, such as a corresponding cam control mechanism, can be omitted.

The control device is generally in communication with the components of the device which are to be subject to open- or closed-loop control as well as with any probes/sensors. Communication can be wireless or wired, digital or analogue. Furthermore, an exchange of data or signals in just one direction is subsumed herein under the term “communication”. The control device need not necessarily be implemented by a central processing device; on the contrary, decentralized and/or multi-level and hierarchical systems, control networks, cloud systems and the like are also included. Moreover, the control device can be an integral component of a higher-level system controller or can communicate with such a system controller.

Attention is drawn to the fact that spatial designations such as “down”, “up”, “below”, “above”, “vertical”, “horizontal”, “gravity direction”, “travel” and the like are clearly defined on the basis of the installation position of the device for use as intended.

The processing of the container, in particular the filling and/or closing thereof, in various embodiments takes place in a sealed atmosphere of the processing region or of the processing chamber, in some embodiments under excess pressure or a vacuum. In the case of abrupt filling, the filling product is provided under an excess pressure, the container transported to the processing position is evacuated, and the filling product under excess pressure is introduced into the container under a vacuum. In order to shorten the settling time of the filling product after the abrupt filling of the container and to prevent foaming and foam spilling over, the container is in one embodiment closed under excess pressure without pressure equalization of the container interior with the external environment taking place beforehand. The filling process and the closing process are in certain embodiments integrated spatially and temporally in the processing chamber inasmuch as a filling member and a closing member are arranged at least partially in the processing chamber. Here, the filling member and/or closing member can be designed to be movable, wherein in several embodiments the container mouth is first pressed against the filling member for the filling of the container and then the filling member is removed in order to create space for the closing member.

It is clear from the above description of abrupt filling that the centering device is in one or more embodiments used with a processing chamber which can be sealed off from the external environment since in this case it is extremely important to transport the container to the required processing position with constant precision.

In addition to the seal centering, the device in some embodiments carries out the abovementioned travel centering, in which an initial centering of the container takes place during insertion into the processing region. In this case, travel centering takes place in a substantially passive way, i.e. the force from the travel movement is used synergistically for centering as the receiving section is pushed upwards by the container and the container aligns itself in the receiving section in this way. In addition, the travel required for movement into and out of the processing region is minimized, thereby making it possible to reduce the processing angle, i.e. the angle which a processing carousel must pass through for the processing (for example for filling and/or closing) of the container. The plant as a whole can be more compact and simplified in terms of machine construction. This also reduces the maintenance effort and maintenance costs. Possible sources of error can be eliminated, thereby improving reliability.

The control device is in some embodiments configured to at least partially inflate the inflatable seal during the translational movement of the container from a position in which a part of the container, in particular the mouth section thereof, has already been inserted into the processing region through the opening into the processing position. In this way, the container is actively moved into the central position by the seal during the travel, thereby making it possible to achieve particularly accurate and material-friendly centering.

The sealing section in one or more embodiments comprises a pressure medium supply, which is in communication with the control device and is configured to feed a pressure medium, for example compressed air, to the inflatable seal, thereby inflating the seal. The actuation of the inflatable seal can thus be accomplished by way of a control signal or a control command from the control device, wherein the pressure medium itself is fed to the seal by the pressure medium supply, comprising, for example, a reservoir and/or a pump and/or a pneumatic cylinder, a corresponding line system, etc. The pressure medium supply and the inflatable seal are thus in fluid communication. As an alternative, the control device itself can comprise such a pressure medium supply. It is likewise possible for the control device to be implemented in a purely mechanical way, i.e. without electronic components, for example by means of a cam control mechanism which initiates the process of inflating the seal during the translational movement of the container.

The guiding section is in certain embodiments attached to the chamber wall, as a result of which the device for centering and the processing chamber are structurally integrated.

The receiving section in one embodiment has a contour which tapers conically in the travel direction of the container, i.e. in the direction from the receiving position to the processing position, thereby making the receiving section suitable especially for bottle necks.

Alternatively or in addition, the receiving section can have a clamp shape with two clamp arms, which in some embodiments form an open ring, thereby enabling the clamp arms to reach around the corresponding container section, for example the bottle neck. Here, the clamp arms in several embodiments form a partial ring in the angular range of between 180° and 220°, for example about 200°. In this way, the container can be moved into the processing region to a level close to the processing member and can be held securely. The travel of the container to the processing member, for example filling member, is thereby minimized, ensuring that the container is ready for processing as quickly as possible.

The receiving section in certain embodiments has a transport section which interacts with the guiding section in such a way that the receiving section can be moved translationally along the defined, for example rectilinear, trajectory.

For this purpose, the transport section can have at least one opening, through which the guiding section at least partially passes, thus enabling the receiving section to be moved along the guiding section. In this way, it is possible for the guided transport for centering the container to be effected in a simple and reliable manner in terms of machine construction.

The transport section in one or more embodiments has at least two openings and the guiding section has at least two associated guide rods, which correspondingly pass through the openings. The two guide rods in one embodiment extend parallel and, in the installed state of the device, substantially vertically downwards from the lower chamber wall. By using two or more guide rods, the receiving section is secured against rotation about the axes of the guide rods in a structurally simple manner. However, the defined guidance and prevention of unwanted degrees of freedom can also be achieved in a technically different way, for example by means of a guide rod having a polygonal cross section which interacts with an opening of the transport section having a corresponding polygonal cross section.

The receiving section is in several embodiments preloaded into the receiving position. For this purpose, the device can have one or more springs, which are arranged, as a spiral spring(s) for example, around the guide rod(s) and are supported on the chamber wall and the receiving section. In this case, the receiving section and/or the chamber wall in some embodiments have/has corresponding openings or depressions for receiving or partially receiving the compressed spring(s). This ensures that the receiving section can be moved into the processing position without the spring(s) between the receiving section and the lower chamber wall interfering with transport. A preload directed into the receiving position can improve the reliability of the device if return of the receiving section into the receiving position by gravity alone is susceptible to faults or takes too much time.

The above-described centering device in the various variant embodiments can be used in a device for processing a container, for example for filling the container with a filling product and/or closing the container with a closure in a beverage filling plant.

The device for processing a container in some embodiments has a processing chamber having the chamber wall which defines the processing region. The processing chamber can in certain embodiments be sealed off from the external environment, wherein, in particular, an excess pressure and/or a vacuum can be built up therein when the container is located at the processing position for the processing thereof.

The technical effects, advantages and embodiments described above with respect to the centering device apply analogously to the device for processing a container.

A method for centering a container during travel thereof into a processing region, for example for filling and/or closing the container in a beverage filling plant comprises: reception of the container at a receiving position by a receiving section in at least one section of the container; translational movement of the container from the receiving position into a processing position for processing of the container in a processing region, wherein the translational movement of the container from the receiving position into the processing position is guided by way of a guiding section, and at least some section or sections of the container are inserted into a processing region through an opening of a chamber wall during the movement; and at least partial inflation of an inflatable seal, which is arranged in the opening, during the translational movement of the container from the receiving position into the processing position.

The technical effects, advantages and embodiments described above with respect to the centering device and the device for processing a container apply analogously to the method.

Thus, for the reasons stated above, the inflatable seal is in one or more embodiments at least partially inflated during the translational movement of the container from a position in which a part of the container, for example the mouth section thereof, has already been inserted into the processing region through the opening into the processing position.

Furthermore, the method can be carried out with a centering device or device for processing a container according to any of the above-described variant embodiments.

Further advantages and features of the present invention are apparent from the following description of exemplary embodiments. The features described therein may be implemented in isolation or in combination with one or more of the features described above, provided that the features are not inconsistent with one another. The following description of exemplary embodiments is given here with reference to the accompanying drawings.

BRIEF DESCRIPTION OF THE FIGURES

Further embodiments of the invention are explained in more detail by the following description of the figures.

DETAILED DESCRIPTION

Exemplary embodiments are described below with reference to the figures. In this case, identical, similar or identically acting elements are provided with identical reference signs in the figures, and a repeated description of these elements is partially dispensed with in order to avoid redundancy.

Figure 1:
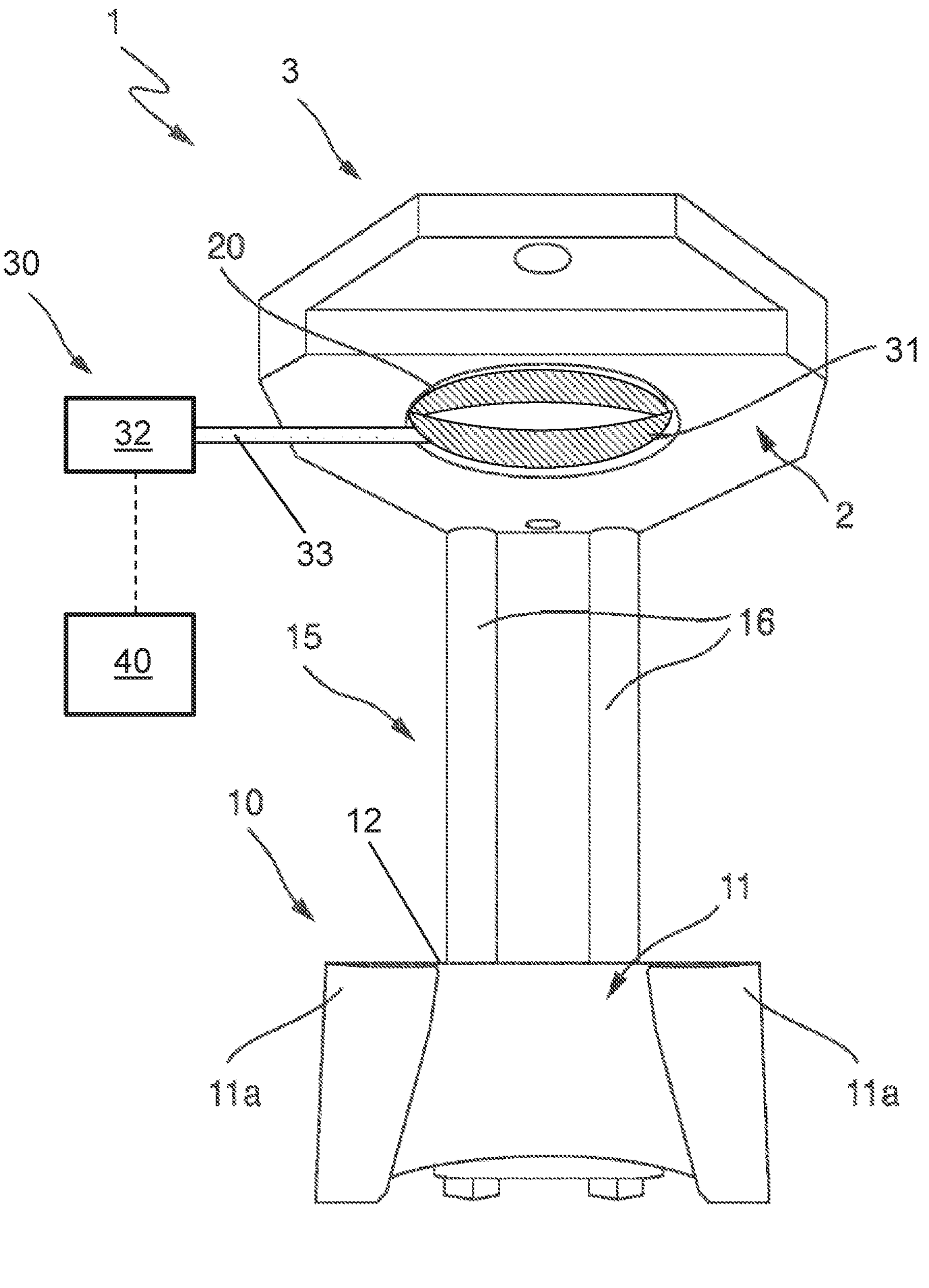
FIG. 1 shows a device for centering a container during travel into a processing region, without a container.
Figure 2:
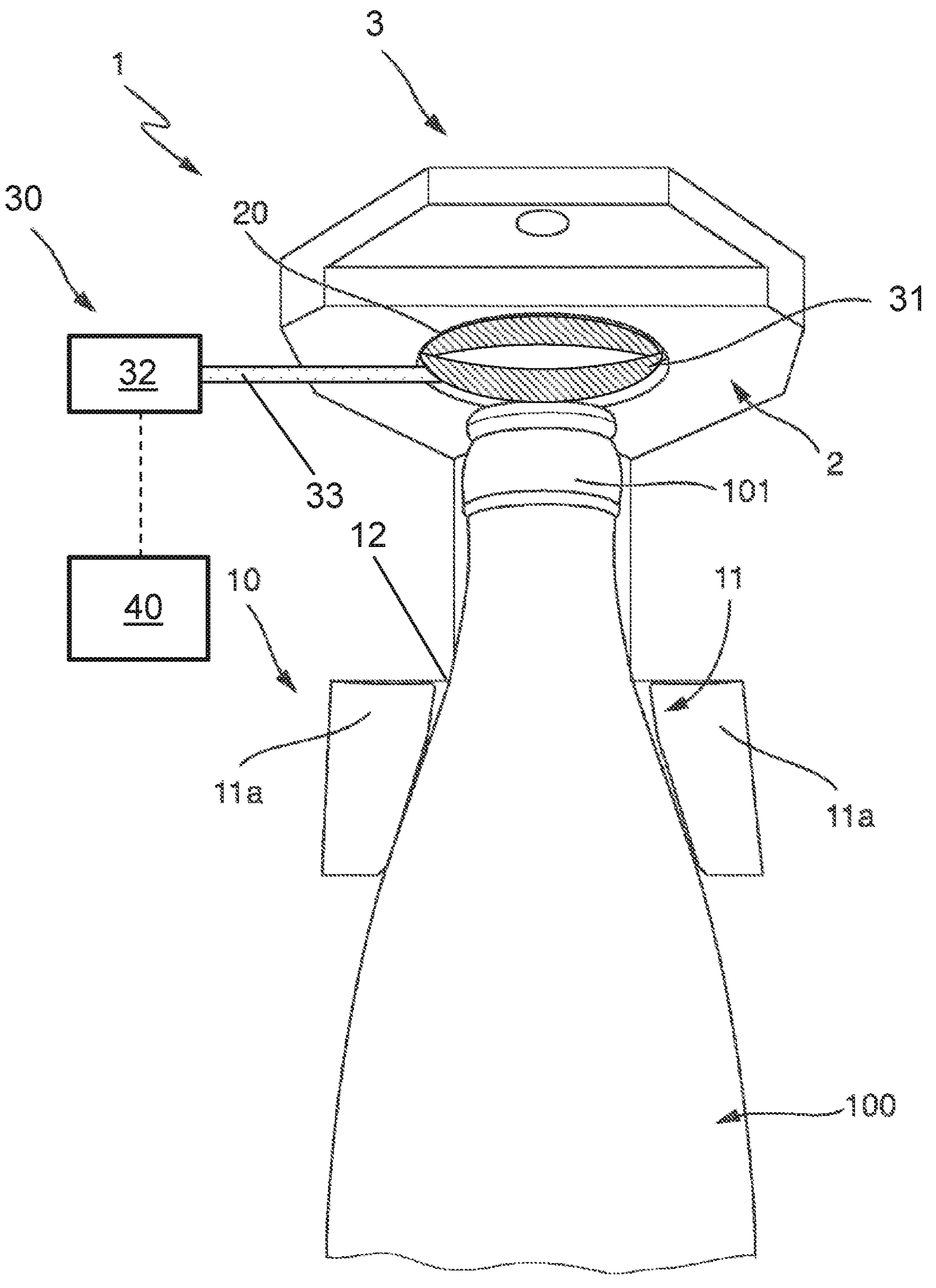
FIG. 2 shows the device of FIG. 1 with the container received in a state before entry to the processing region.
Figure 3:
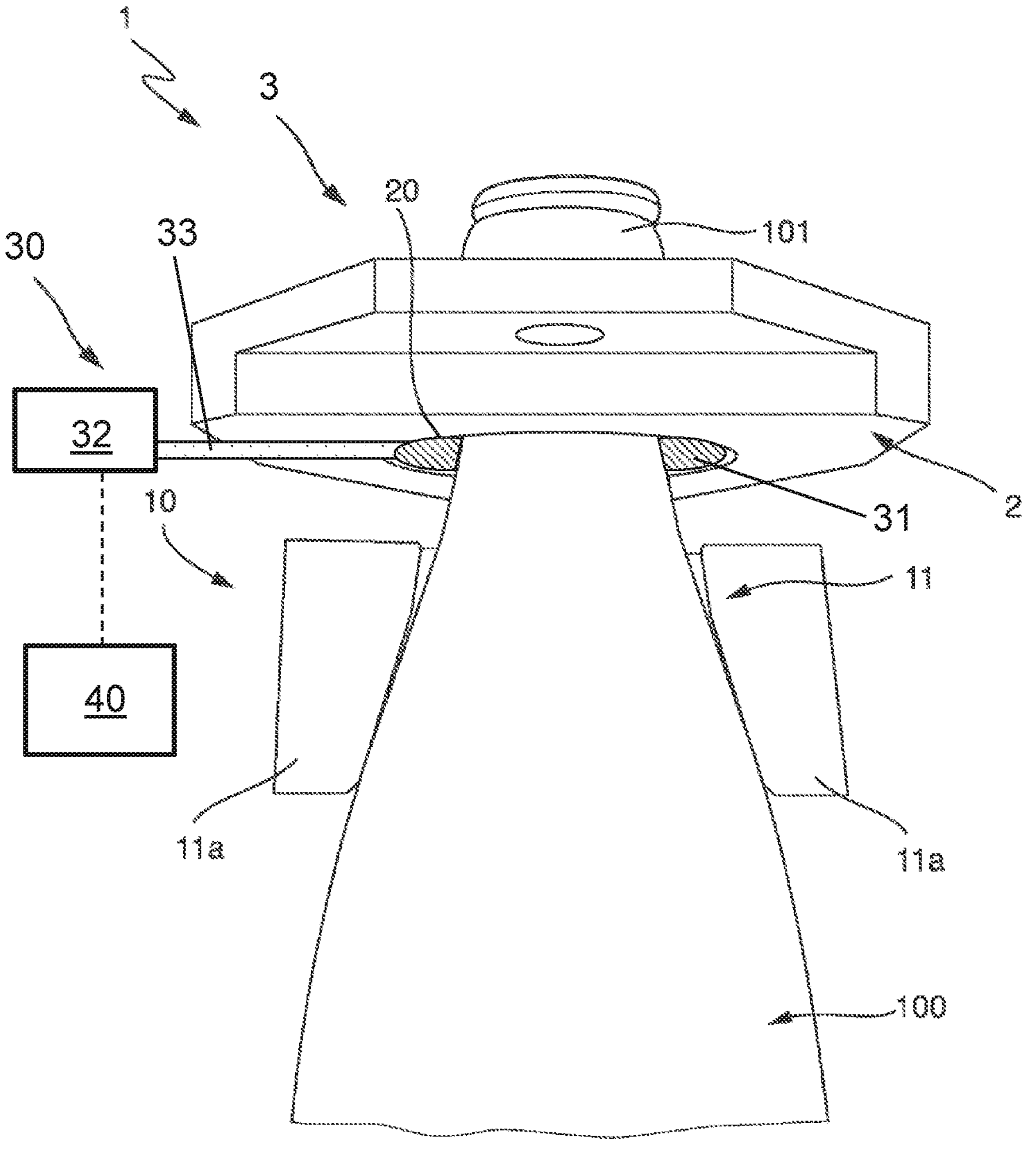
FIG. 3 shows the device of FIG. 1 with the container received in a state after entry to the processing region.

FIG. 1 shows a device 1, also referred to herein as a "centering device", for centering a container during the movement or travel of the container into a processing region 3. FIG. 1 shows the device 1 without a container, while FIGS. 2 and 3 show the device 1 in different states with a received container 100, which is a bottle here by way of example.

Any processing members, such as a filling member and/or a closing member, are arranged in the processing region 3, but are not shown in the figures for the sake of clarity. The processing region 3 in an exemplary embodiment comprises a processing chamber, the lower chamber wall 2 of which is shown in the figures with an opening 20, through which at least the mouth section 101 of the container 100 is to be inserted.

The processing of the container 100, for example the filling and/or closing thereof, in some embodiments takes place in a sealed atmosphere of the processing chamber, for example under excess pressure and/or a vacuum. For this purpose, a sealing device 30 having an annular inflatable seal 31 is provided in the opening 20. In the inserted state of the container 100, the inflatable seal 31 comes to rest sealingly around a relevant section, for example the mouth section 101 thereof. The structure and functioning of the sealing device 30 are described in detail below.

The device 1 has a lifting section 10 and a guiding section 15. The guiding section 15 is configured to guide a translational movement of the lifting section 10.

In the present exemplary embodiment, the guiding section 15 has two guide rods 16 which extend parallel and, in the installed state, vertically downwards from the chamber wall 2. The guide rods 16 are secured on the lower chamber wall 2, being screwed on or in, for example. In this case, the lower chamber wall 2 can be considered to be part of the centering device 1. However, the guiding section 15 can also be attached to some other machine part and/or have a different construction as long as the functionality of the lifting section 10 described below is ensured.

The lifting section 10 has a receiving section 11 and a transport section 12. The transport section 12 interacts with the guiding section 15, enabling the lifting section 10 or the receiving section 11 to be moved in translation along a defined trajectory.

In the present exemplary embodiment, the transport section 12 is formed essentially by two openings (not visible in the figures owing to the perspective), through each of which a guide rod 16 passes, with the result that the movement trajectory of the lifting section 10, i.e. the degree of freedom of movement, corresponds to the direction of extent of the two guide rods 16. The provision of two or more guide rods 16 ensures that the lifting section 10 is secured against rotation about the axes of the guide rods 16 in a structurally simple manner. However, the defined guidance and prevention of unwanted degrees of freedom can also be achieved in a technically different way, for example by means of a guide rod having a polygonal cross section which interacts with an opening of the transport section 12 having a corresponding polygonal cross section.

The receiving section 11 serves to receive a container section. In the case of a bottle, e.g. a glass or plastic bottle, the bottle neck is in one embodiment received, i.e. stabilized and at least roughly centered, by the receiving section 11. For this purpose, the receiving section 11 in some embodiments coincides with the corresponding container contour. The contour of the receiving section 11 in certain embodiments tapers conically in the travel direction of the container 100.

In the present exemplary embodiment, the receiving section 11 has a clamp shape with two clamp arms **11*a*, which form an open ring or partial ring. The clamp arms 11*a* surround the corresponding container section, for example the bottle neck, at least partially, for example over an angle of between 180° and 220°, for example about 200°. In this way, the container 100 can be moved into the processing chamber to a level close to the processing member and can be held securely. The travel of the container 100 to the processing member, for example filling member, is thereby minimized, ensuring that the container 100** is ready for processing, or filling, as quickly as possible.

The receiving section 11 can be made from a plastic with a certain flexibility in order to allow passive adaptation and gentle centering when the container 100 moves into the receiving section 11 from below and/or laterally. The lifting section 10 can also be of integral design. Even if the receiving section 11 in the present exemplary embodiment receives the container 100 in a purely passive manner, the receiving section 11 can alternatively have actively adjustable clamp arms in order to grip the container 100 even more securely and reliably if necessary.

To move the container 100 into the processing region 3, the latter is fed laterally and/or from below to the receiving section 11, which is located in a lower position, also referred to herein as the "receiving position", with the result that the said section at least partially surrounds the corresponding container section. This state is evident from FIG. 2. In this case, the container 100 is transported by a lifting device, which is not illustrated in the figures. For example, the container 100 stands on a lifting plate.

Lifting the container 100 by means of the lifting device causes the latter to move upwards together with the lifting section 10, in that the container 100 pushes the receiving section 11 upwards until the mouth section 101 enters the processing region 3 and the container 100 reaches the desired processing position. As a result of the upward movement of the container 100 and the defined guidance of the receiving section 11, an initial centering, also referred to herein as "travel centering", of the container 100 takes place at the same time, with the result that the latter is moved reliably and precisely into the processing position.

The travel centering is in various embodiments purely passive. No further actuators are required for the travel cent ring of the container 100. In this case, the transport of the lifting section 10 also takes place passively, i.e. without its own drive. On the contrary, the lifting section 10 is pushed upwards by the container 100 via the receiving section 11. The inserted state, in which the container 100 is located at the processing position, is shown in FIG. 3.

After the processing of the container 100, for example filling and/or closing, the latter is moved downward out of the processing region 3 by means of the lifting device.

In the simplest case, the lifting section 10 returns to the starting position, i.e. the receiving position, on account of gravity. However, this process can be supported by the lifting section 10 being preloaded into the receiving position.

For this purpose, the device 1 can have one or more springs (not illustrated in the figures), which are arranged, as a spiral spring(s) for example, around the guide rod(s) 16 and are supported on the chamber wall 2 and the lifting section 10. In this case, the lifting section 10 and/or the chamber wall 2 in certain embodiments have/has corresponding openings or depressions for receiving or partially receiving the compressed spring(s). This ensures that the lifting section 10 can be moved into the processing position without the spring(s) between the lifting section 10 and the lower chamber wall 2 interfering with transport.

The centering device 1 described above allows initial centering of the container 100 as it moves into the processing chamber, without the container 100 having to pass through under a conventional centering ring. Actuators for moving such a centering ring, such as a corresponding cam control mechanism, can be omitted. In this case, travel centering takes place in a substantially passive way, i.e. the force from the travel movement is used synergistically for centering as the lifting section 10 is pushed upwards by the container 100 and the container 100 aligns itself in the receiving section 11 in this way. In addition, the travel required for movement into and out of the processing chamber is minimized, thereby making it possible to reduce the processing angle, i.e. the angle which a processing carousel must pass through for the processing (for example for filling and/or closing) of the container 100. The plant as a whole can be more compact and simplified in terms of construction. This also reduces the maintenance effort and maintenance costs. Possible sources of error can be eliminated, thereby improving reliability.

An improvement in the centering, in particular to compensate for any container variations, is accomplished by virtue of the fact that the inflatable seal 31 is already activated during the upward movement of the container 100. This centering process, which is explained in more detail below, is also referred to herein as "seal centering".

For this purpose, the device 1 has a sealing device 30 with the inflatable seal 31, which is in communication with a control device 40. The control device 40 is configured to correspondingly inflate the inflatable seal 31 by means of a pressure medium 33, for example compressed air.

The control device 40 is generally in communication with the components of the device which are to be subject to open- or closed-loop control as well as with any probes/sensors. Communication can be wireless or wired, digital or analogue. Furthermore, an exchange of data or signals in just one direction is subsumed herein under the term "communication". The control device 40 need not necessarily be implemented by a central processing device; on the contrary, decentralized and/or multi-level and hierarchical systems, control networks, cloud systems and the like are also included. Moreover, the control device 40 can be an integral component of a higher-level system controller or can communicate with such a system controller.

The communication of the control device 40 with the sealing device 30 is indicated schematically in the figures by a dashed line. Here, the actuation of the inflatable seal 21 can be accomplished by a control signal or a control command, wherein the pressure medium 33 is fed to the seal 31 by a corresponding pressure medium supply 32, comprising, for example, a reservoir and/or a pump and/or a pneumatic cylinder, a corresponding line system, etc. As an alternative, the control device 40 itself can comprise such a pressure medium supply 32. It is likewise possible for the control device 40 to be implemented in a purely mechanical way, i.e. without electronic components, for example by means of a cam control mechanism which initiates the process of inflating the seal 31 during the upward travel of the container 100.

As a result of the activation of the seal 31 by the control device 40, the pressure medium 33 flows into the inflatable seal 31 and thus pushes its sealing surface in the direction of the container 100, which is thereby pushed in the direction of the center of the opening 20 until finally all sides of the seal 31 bear against the container 100, in particular against the bottle neck. The inflation of the seal 31 thus takes place before the container 100 has reached the processing position, in particular before the container 100 is pressed against a corresponding processing member, in order to achieve centering in this way.

In this way, the container 100 is pushed into a central position, in which the container 100 is later arranged leaktightly against a vacuum and/or excess pressure in the processing region 3. After being moved into this central position, the container 100 then moves the remaining travel distance into the processing position, that is to say, for example, up to the position in which it is pressed against a filling member. This upward movement thus takes place in the activated or partially activated state of the seal 31, i.e. in a completely or partially inflated state of the seal 31, and in several embodiments during the activation or partial activation of the seal 31.

Owing to such seal centering, it is no longer necessary for complete centering to be performed by the receiving section 11 or travel centering. On the contrary, it is the sealing device with the inflatable seal 31, under the control of the control device 40, which brings the container 100 into the optimally centered position that ensures complete sealing of the container 100 and trouble-free processing.

By means of the seal centering, optimum alignment and sealing of the container 100 to be processed can be achieved in a reliable and repeatable way. This success is substantially independent of the nature of the seal 31 and any deviations in shape and/or size of the containers 100. In this way, the desired processing of the container 100 is reliably ensured, and the intended quality parameters, for example any $O_2$ absorption and/or $CO_2$ consumption, can be achieved.

The seal centering also makes it possible to reduce the centering function performed by the receiving section 11, i.e. the travel centering, thereby making it possible to simplify the construction of the receiving section 11 as well as of the guiding section 15 and the transport section 12. In particular, it is possible, when changing the container format, to dispense with replacement of a correspondingly optimally adapted receiving section 11. Since the receiving section 11 then only has to guide the container 100 as far as the seal 31, but not to center it, or to center it only roughly, the receiving section 11 can be configured in such a way that it can be used for all or at least many container formats. This saves manufacturing costs and shortens the stoppage times of the device 1 during a format change.

As far as applicable, all individual features which are shown in the exemplary embodiments can be combined and/or exchanged with one another without exceeding the scope of the invention.

What is claimed is:

1. A device for centering a container during travel thereof into a processing region, comprising:

a receiving section configured to receive the container;

a guiding section configured to guide a translational movement of the receiving section along a defined trajectory between a receiving position for reception of the container by the receiving section and a processing position for processing the container in the processing region;

a chamber wall having an opening, wherein the receiving section and the guiding section are configured to guide a section of the container into the processing region through the opening during the translational movement from the receiving position into the processing position;

a sealing device having an inflatable seal that is arranged in the opening and configured to adopt a sealing position around the container in the processing position; and a control device in communication with the sealing device and configured to at least partially inflate the inflatable seal during the translational movement of the container from the receiving position into the processing position.

2. The device of claim 1, wherein the control device is configured to partially inflate the inflatable seal during the translational movement of the container from a position in which a part of the container has already been inserted into the processing region through the opening into the processing position.

3. The device of claim 2, wherein the part of the container that has already been inserted into the processing region comprises a mouth section of the container.

4. The device of claim 1, wherein the sealing device comprises a pressure medium supply in communication with the control device, and the pressure medium supply is configured to feed a pressure medium to the inflatable seal to inflate the inflatable seal.

5. The device of claim 4, wherein the pressure medium comprises compressed air.

6. The device of claim 1, wherein the guiding section is attached to the chamber wall.

7. The device of claim 1, wherein the receiving section has a contour that tapers conically in a travel direction of the container and/or has a clamp shape with two clamp arms.

8. The device of claim 7, wherein the receiving section has the clamp shape with the two clamp arms and the two clamp arms form an open ring.

9. The device of claim 1, wherein the receiving section comprises a transport section that interacts with the guiding section in such a way that the receiving section is movable translationally along the defined trajectory.

10. The device of claim 9, wherein the defined trajectory comprises a rectilinear trajectory.

11. The device of claim 9, wherein the transport section has an opening through which the guiding section at least partially passes, to enable the receiving section to be moved along the guiding section.

12. The device of claim 9, wherein the transport section has two openings and the guiding section has two associated guide rods that correspondingly pass through the two openings.

13. The device of claim 1, wherein the receiving section is preloaded into the receiving position.

14. The device of claim 13, wherein the receiving section is preloaded into the receiving position by one or more springs.

15. A device for processing a container, which comprises:

the device of claim 1; and a processing chamber having the chamber wall, which defines the processing region, wherein the processing chamber is configured to be sealed off from an external environment.

16. The device of claim 15, wherein the processing chamber is further configured to hold an excess pressure and/or a vacuum when the container is located at the processing position.

* * * * *